UNITED STATES PATENT OFFICE.

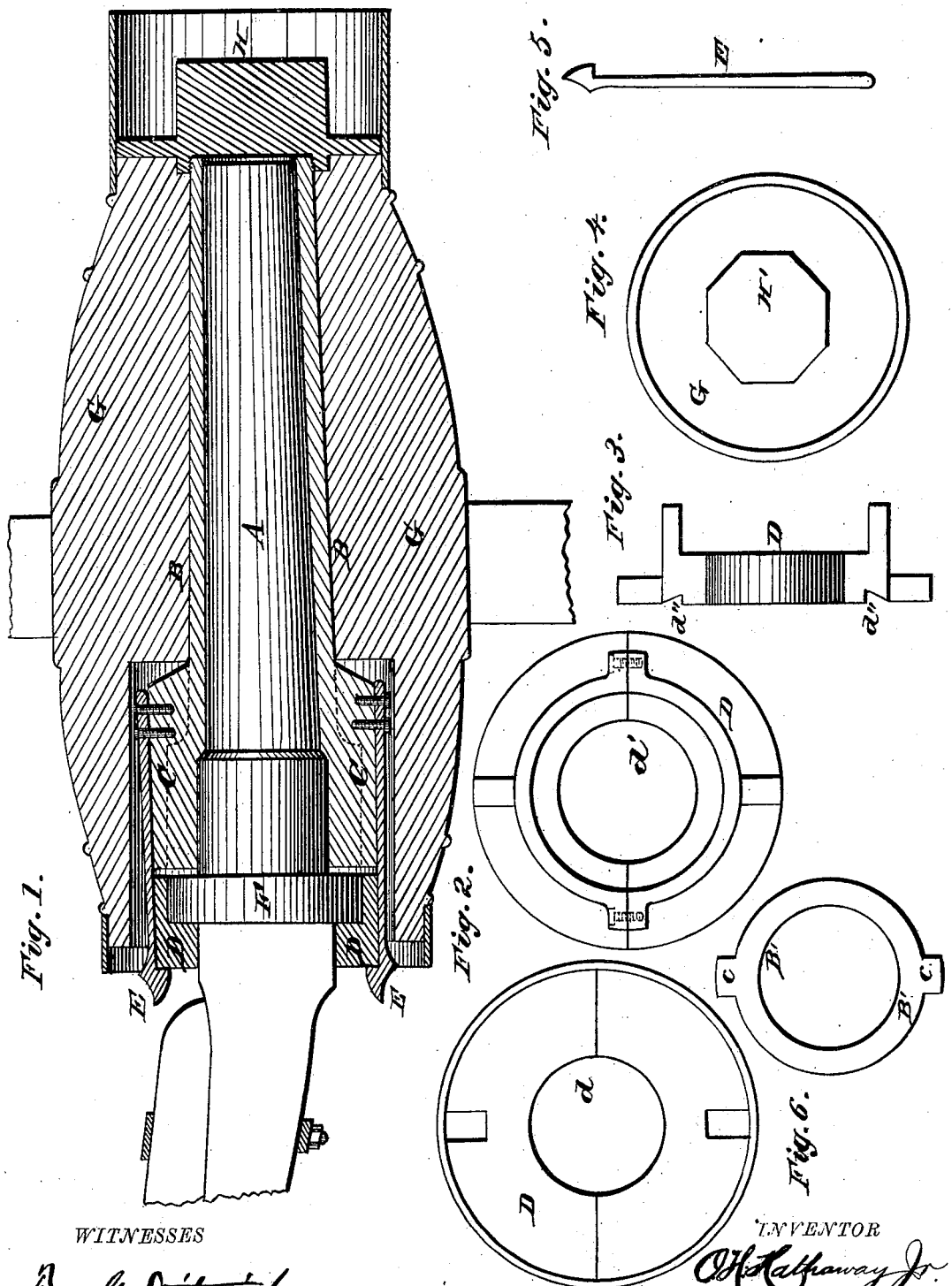

OLIVER H. HATHAWAY, JR., OF CENTRAL FALLS, RHODE ISLAND.

HUB-ATTACHING DEVICE FOR VEHICLE-AXLES.

SPECIFICATION forming part of Letters Patent No. 245,374, dated August 9, 1881.

Application filed June 18, 1881. (No model.)

*To all whom it may concern:*

Be it known that I, OLIVER H. HATHAWAY, Jr., of Central Falls, in the county of Providence and State of Rhode Island, have invented certain new and useful Improvements in Adjustable Hubs and Axles; and I do hereby declare that the following is a full, clear, and exact description of the invention, which will enable others skilled in the art to which it appertains to make and use the same, reference being had to the accompanying drawings, which form a part of this specification.

The object of my invention is to the more readily and easily attach the wheel of a carriage to the axle by means of a set of springs in the place of a nut or other ordinary methods, and thereby avoid the necessity of the aid of a wrench in removing and replacing the wheel, at the same time promoting by its facility the cleanliness of both the hub and axle.

In the drawings, Figure 1 represents the hub and axle in position. Fig. 2 represents the inside and outside of the flange; Fig. 3, a side view of the flange. Fig. 4 represents the end of the hub. Fig. 5 represents the spring; and Fig. 6 an end view of the box, showing lugs to which the springs are fastened.

A represents the spindle, solidly attached to the axle of any vehicle; B, the boxing inserted in the hub; C C, the lugs cast onto the box.

E E are the springs, attached to the box by means of two screws in the end of each spring, as seen in Fig. 1.

D D are the flanges on which the springs catch, and which hold the wheel on the axle.

F F show the collar, which is forged and turned on the axle on which the flange runs.

G G represent the hub, and H represents a cap, which screws on over the end of box B, thus making it perfectly tight, so that no oil can escape at the end. The inside end is also tight, and allows no oil to escape, except enough to lubricate the flange.

$d$ and $d'$, Fig. 2, represent the outer and inner ends of flange D, and can be made either in one or two pieces by preference.

D in Fig. 3 shows side view of the flange, with notch $d''$ cut therein, and in which spring E rests when in position.

H' in Fig. 4 shows end of hub G, over which cap H fits and precludes the possibility of dust and other gritty matter from entering.

B' in Fig. 6 is an end view of box, with lugs C attached, to which springs E E are fastened.

Having thus described my invention, what I claim, and desire to secure by Letters Patent, is—

As an improvement in adjustable hubs and axles, the combination, with the hub G, having cap H, and spindle A, having collar F, of the boxing B, provided with top and bottom flanges, C C, at its rear end, to which are secured springs E E, and the adjustable holding-flange D, made in two semicircular pieces, all arranged and operating substantially as and for the purpose shown and specified.

In testimony that I claim the foregoing as my own I have hereto affixed my signature in presence of two witnesses.

OLIVER H. HATHAWAY, JR.

Witnesses:
WM. C. BENNETT,
GEO. W. MILLER.